United States Patent
Nagayoshi (10) Patent No.: US 10,647,166 B2
(45) Date of Patent: May 12, 2020

(54) TIRE AND TIRE MANUFACTURING METHOD

(71) Applicant: Toyo Tire Corporation, Itami-shi, Hyogo (JP)

(72) Inventor: Hiraku Nagayoshi, Itami (JP)

(73) Assignee: Toyo Tire Corporation, Itami-shi (JP)

( * ) Notice: Subject to any disclaimer, the term of this patent is extended or adjusted under 35 U.S.C. 154(b) by 0 days.

(21) Appl. No.: 16/589,424

(22) Filed: Oct. 1, 2019

(65) Prior Publication Data

US 2020/0108670 A1    Apr. 9, 2020

(30) Foreign Application Priority Data

Oct. 3, 2018   (JP) ................. 2018-188127

(51) Int. Cl.
 *B60C 19/00*   (2006.01)
(52) U.S. Cl.
 CPC ........ *B60C 19/00* (2013.01); *B60C 2019/004* (2013.01)
(58) Field of Classification Search
 CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 23/0493; B60C 19/00; B60C 23/04; B60C 23/0498; B60C 23/064; B60C 23/0488; B60C 23/0496; B60C 23/0408; B60C 23/041; B60C 23/0411; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003;
(Continued)

(56) References Cited

U.S. PATENT DOCUMENTS

| 4,911,217 A | 3/1990 | Dunn et al. |
| 5,181,975 A | 1/1993 | Pollack et al. |

(Continued)

FOREIGN PATENT DOCUMENTS

| EP | 1 223 056 A2 | 7/2002 |
| FR | 3 059 603 A1 | 6/2018 |

(Continued)

OTHER PUBLICATIONS

Notice of Reasons for Rejection dated Jun. 4, 2019 in corresponding Japanese application No. 2018-188127; 7 pages.

(Continued)

*Primary Examiner* — Andre J Allen
(74) *Attorney, Agent, or Firm* — Maier & Maier, PLLC (57) ABSTRACT

A tire includes a pair of beads having a bead filler which extends to an outer side in the tire-radial direction of a bead core, and a carcass ply which extends from one bead to another bead and is folded back around the bead core, in which an electronic component is embedded in an area range of 10 mm to an inner side in the tire-radial direction from a tire-radial direction outside end of the bead filler.

5 Claims, 12 Drawing Sheets

(58) Field of Classification Search
CPC ... B60C 23/004; B60C 23/02; B60C 23/0401;
B60C 23/0406; B60C 23/0416; B60C
23/0433; B60C 23/0455; B60C 23/0459;
B60C 23/0474; B60C 23/0489; B60C
23/0491; B60C 25/002; B60C 25/005;
B60C 25/007; B60C 29/02; B60C 99/006;
B60C 11/0332; B60C 11/24; B60C
13/001; B60C 13/02; B60C 15/0036;
B60C 17/02; B60C 2009/0071; B60C
2009/2022; B60C 2200/02; B60C
2200/06; B60C 2200/065; B60C 23/001;
B60C 23/007; B60C 23/008; B60C
23/0413; B60C 23/0427; B60C 23/0447;
B60C 23/0454; B60C 23/0457; B60C
23/0462; B60C 23/0467; B60C 23/0471;
B60C 23/0472; B60C 23/0476; B60C
23/0479; B60C 23/0484; B60C 23/065;
B60C 23/066; B60C 23/10; B60C
25/0548; B60C 25/056; B60C 25/132;
B60C 25/138; B60C 25/18; B60C 29/005;
B60C 9/005; B60C 9/18; B60C 9/1807;
B60C 9/20; B60C 9/28
USPC .................................................. 73/146–146.8
See application file for complete search history.

(56) References Cited

U.S. PATENT DOCUMENTS

| | | | | |
|---|---|---|---|---|
| 2006/0238356 | A1* | 10/2006 | Tucker | G06K 19/04 340/572.8 |
| 2010/0108211 | A1* | 5/2010 | Fenkanyn | B60C 23/0493 152/152.1 |
| 2010/0122757 | A1* | 5/2010 | Lionetti | B60C 23/041 152/152.1 |
| 2010/0123584 | A1* | 5/2010 | Lionetti | B60C 23/041 340/572.8 |
| 2011/0175778 | A1 | 7/2011 | Myatt | |
| 2011/0198402 | A1* | 8/2011 | Tucker | B60C 23/0452 235/492 |
| 2016/0107490 | A1* | 4/2016 | Randall | B29D 30/0061 152/510 |
| 2016/0303921 | A1* | 10/2016 | Miklic | B60C 19/00 |
| 2017/0357887 | A1* | 12/2017 | Wei | B60C 11/24 |
| 2019/0300680 | A1* | 10/2019 | Cho | C08L 7/00 |
| 2019/0322142 | A1 | 10/2019 | Lallement et al. | |

FOREIGN PATENT DOCUMENTS

| | | | | |
|---|---|---|---|---|
| JP | H02-123404 U | 5/1990 | | |
| JP | H05-169931 A | 7/1993 | | |
| JP | 2000-108619 A | 4/2000 | | |
| JP | 2002-214060 A | 7/2002 | | |
| JP | 2016-037236 A | 3/2016 | | |
| JP | 2017-132291 A | 8/2018 | | |
| KR | 10-2010-0120505 A | 11/2010 | | |
| WO | WO-2017130956 A1 * | 8/2017 | | B60C 19/00 |
| WO | 2018/104623 A1 | 6/2018 | | |
| WO | 2018/224196 A1 | 12/2018 | | |
| WO | 2018/234650 A1 | 12/2018 | | |

OTHER PUBLICATIONS

Decision to Grant dated Aug. 27, 2019 in corresponding Japanese application No. 2018-188127; 10 pages.
Extended European Search Report dated Jan. 24, 2020, including the European Search Report and the European Search Opinion (7 pgs.).

* cited by examiner

TIRE AND TIRE MANUFACTURING METHOD

CROSS-REFERENCE TO RELATED APPLICATIONS

This application is based on and claims the benefit of priority from Japanese Patent Application No. 2018-188127, filed on 3 Oct. 2018, the content of which is incorporated herein by reference.

FIELD

The present invention relates to a tire into which an electronic component is embedded, and a tire manufacturing method.

BACKGROUND

Conventionally, a tire embedding an electronic component such as an RFID tag has been known. With such a tire, it is possible to carry out production management of the tire, usage history management, etc. by the RFID tag embedded in the tire and a reader as external equipment carrying out communication. For example, Japanese Unexamined Patent Application, Publication No. 2016-37236 discloses a tire embedding an RF tag in the vicinity of a stiffener.

SUMMARY

However, in the technology shown in Japanese Unexamined Patent Application, Publication No. 2016-37236, the RF tag is arranged between the stiffener and side rubber, and a fiber layer such as that of a carcass ply does not exist between the RF tag and the tire outer wall. Consequently, in the case of the tire greatly distorting, or a case of shock acting on the tire, there is concern over the RF tag not being protected and thus being damaged.

In addition, with the technology illustrated in Japanese Unexamined Patent Application, Publication No. 2016-37236, the RF tag is arranged in the vicinity of a stiffener adjacent to a metal bead core. Consequently, the communication state of an electronic device such as the RF tag having a communication function is influenced by the bead core made of metal and becomes unstable, and there is a possibility of no longer being able to exhibit the function of the electronic component itself.

The present invention has been made taking account of the above-mentioned problem, and a first object thereof is to provide a tire and tire manufacturing method which can protect an electronic component, in a case of the tire greatly distorting, or a case of shock acting on the tire.

In addition, the present invention has been made taking account of the above-mentioned problem, and a second object thereof is to provide a tire and tire manufacturing method which can maintain the performance of the electronic component, by arranging an electronic component at a position distanced from metal components.

A tire according to a first aspect of the present invention includes: a pair of beads having a bead filler which extends to an outer side in a tire-radial direction of a bead core; and a carcass ply which extends from one bead to an other bead, and is folded back around the bead core, in which an electronic component is embedded in an area range of 10 mm to an inner side in a tire-radial direction from a tire-radial direction outside end of the bead filler.

According to a second aspect of the present invention, in the tire as described in the first aspect, the electronic component may be embedded at a position which is 5 mm+/−3 mm from the tire-radial direction outside end of the bead filler.

According to a third aspect of the present invention, in the tire as described in the first or second aspect, the electronic component may be provided between the bead filler and the carcass ply.

According to a fourth aspect of the present invention, in the tire as described in the third aspect, the electronic component may be provided between the bead filler, and a ply folding part of the carcass ply which may be folded back around the bead core and disposed to an outer side in a tire-width direction relative to the bead filler.

According to a fifth aspect of the present invention, in the tire as described in the third aspect, the electronic component may be provided between the bead filler and a ply body of the carcass ply which is disposed at an inner side in a tire-width direction relative to the bead filler.

A manufacturing method according to a sixth aspect of the present invention for a tire includes: a pair of beads having a bead filler which extends to an outer side in a tire-radial direction of a bead core; and a carcass ply which extends from one bead to an other bead, and is folded back around the bead core, an electronic component being embedded in an area range of 10 mm to an inner side in a tire-radial direction from a tire-radial direction outside end of the bead filler, in which the method includes a step of mounting the electronic component so that a longitudinal direction thereof follows a direction of a tangential line relative to a circumferential direction of the tire.

According to the present invention, it is possible to provide a tire and tire manufacturing method which can protect an electronic component, in a case of the tire greatly distorting, or a case of shock acting on the tire.

In addition, according to the present invention, it is possible to provide a tire and tire manufacturing method which can maintain the performance of the electronic component, by arranging an electronic component at a position distanced from metal components.

DETAILED DESCRIPTION

Figure 1:
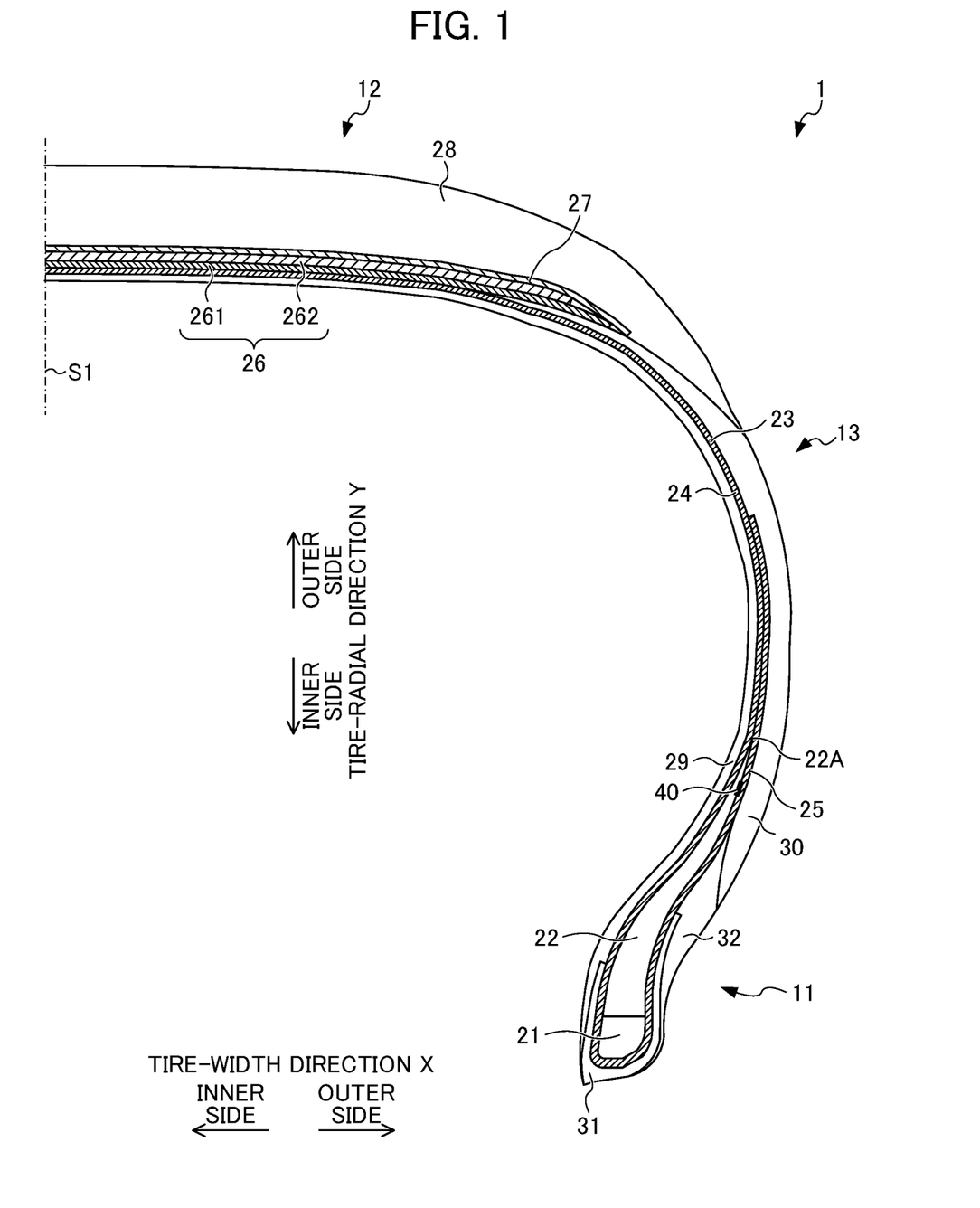
FIG. 1 is a view showing a half section in a tire-width direction of a tire according to an embodiment of the present invention.

Hereinafter, an embodiment of the present invention will be explained while referencing the drawings. FIG. 1 is a view showing a half section in a tire-width direction of a tire 1 according to the present embodiment. The basic structure of the tire is left/right symmetric in the cross section of the tire-width direction; therefore, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction. Herein, tire-width direction is a direction parallel to the tire rotation axis, and is the left/right direction of the paper plane of the cross-sectional view in FIG. 1. In FIG. 1, it is illustrated as the tire-width direction X. Then, inner side of tire-width direction is a direction approaching the tire equatorial plane S1, and is the left side of the paper plane in FIG. 1. Outer side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer side of tire-radial direction is a direction distancing from the tire rotation axis, and is the upper side of the paper plane in FIG. 1. Inner side of tire-radial direction is a direction approaching the tire rotation axis, and is the lower side of the paper plane in FIG. 1. The same also applies to FIGS. 2 to 6, 9, 11 and 12.

Figure 2:
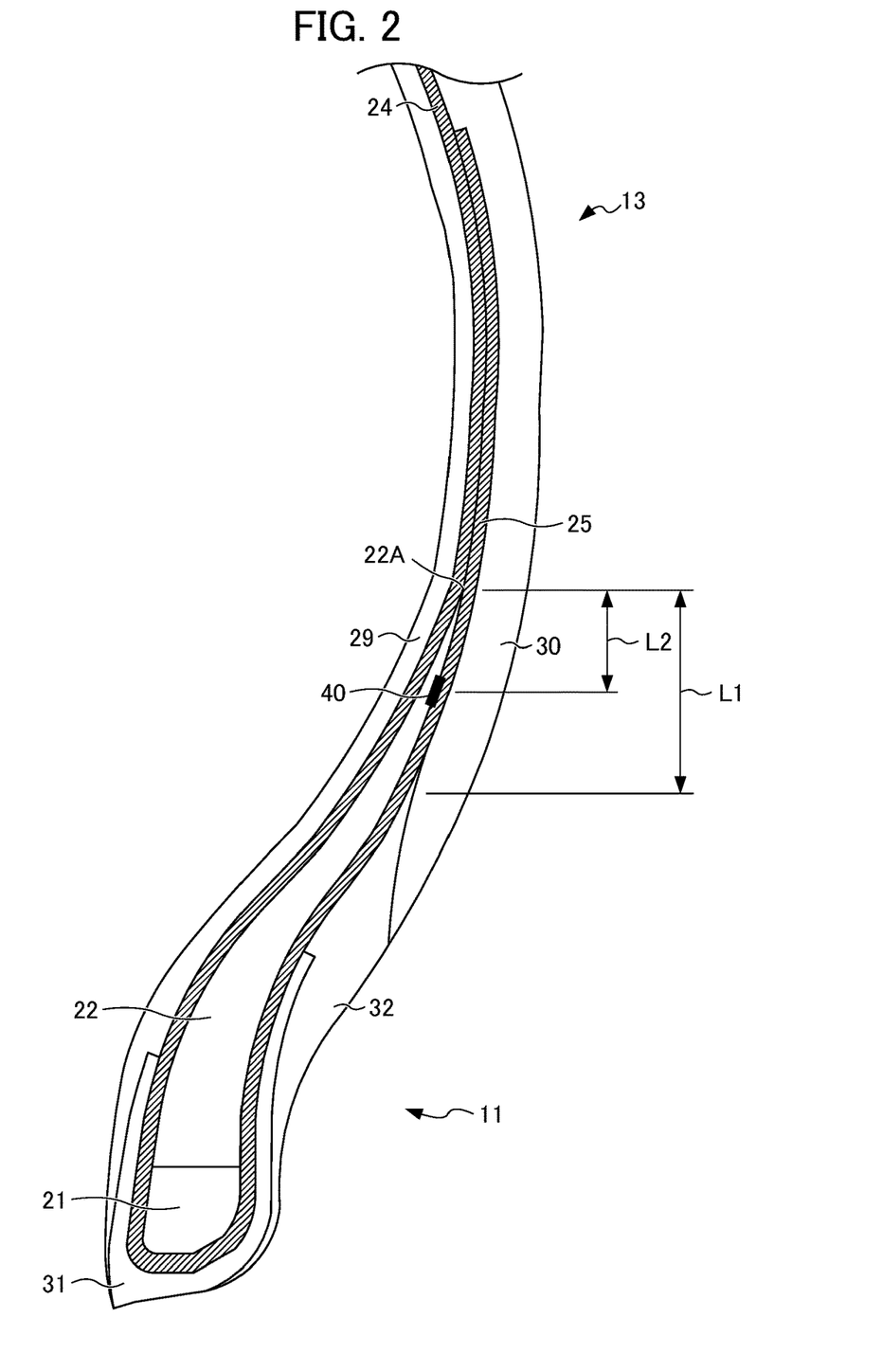
FIG. 2 is a partially enlarged cross-sectional view of the tire in FIG. 1.
Figure 3:
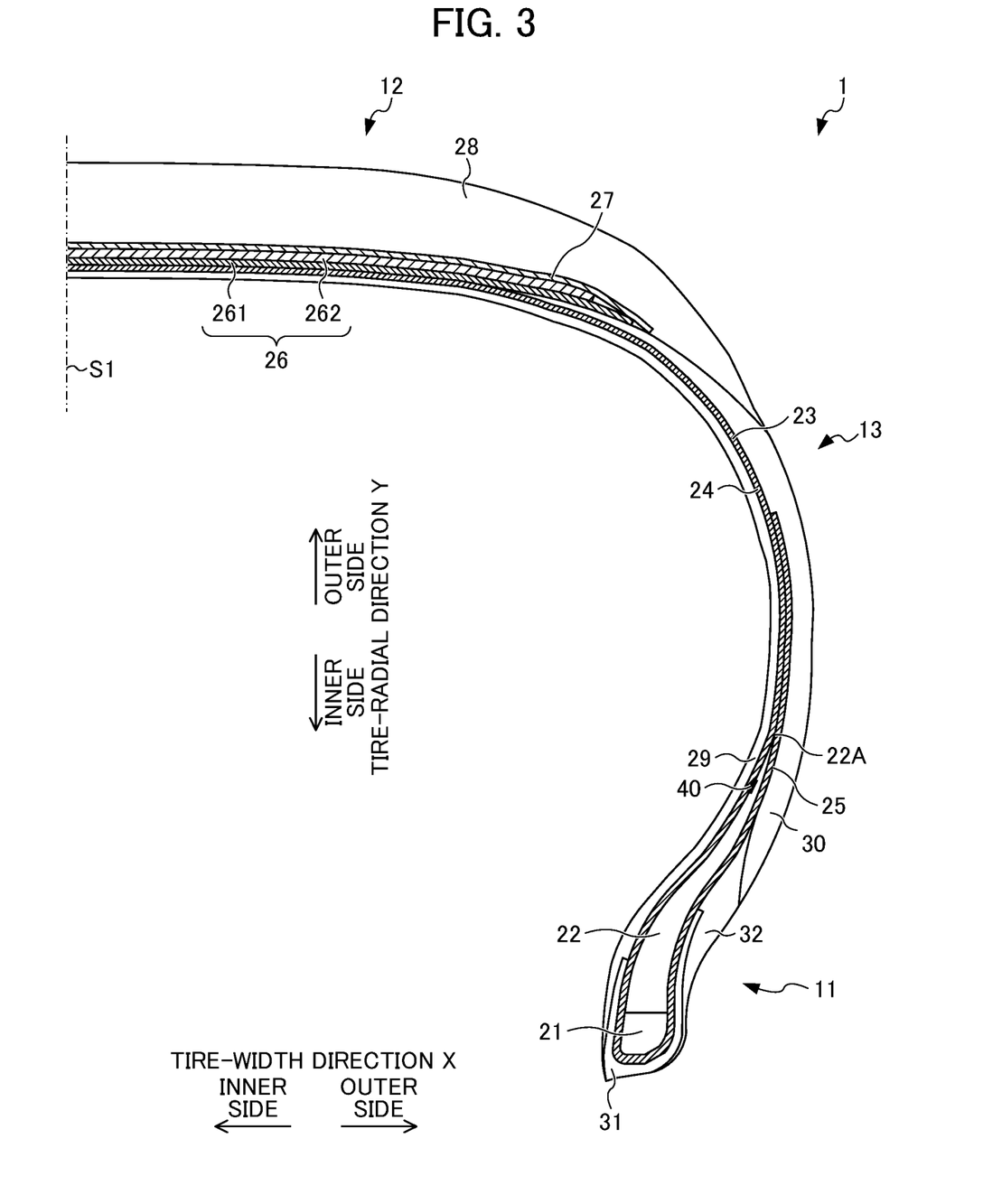
FIG. 3 is a view showing a modified example of the tire according to the embodiment of the present invention, which is a half section in the tire-width direction.
Figure 4:
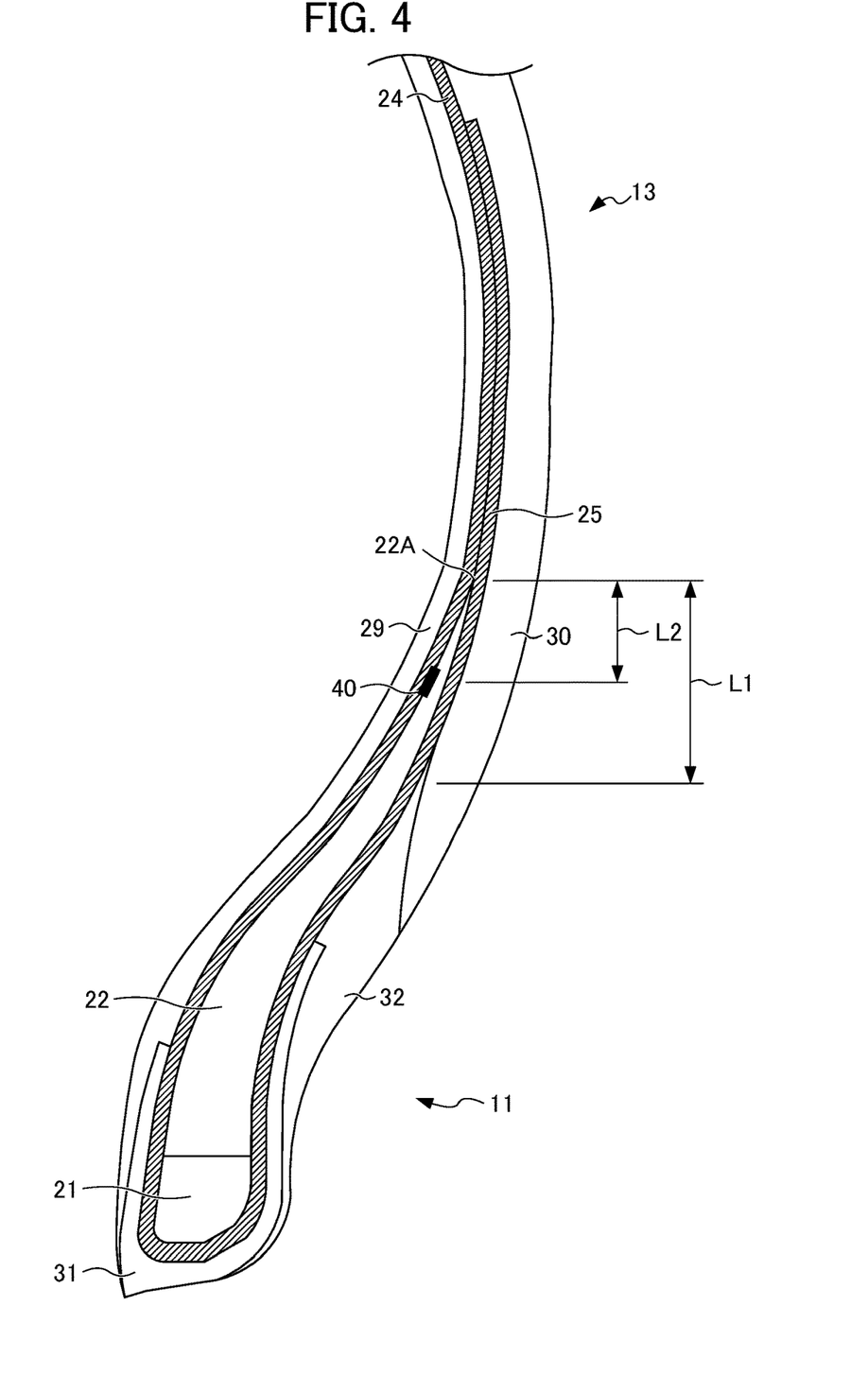
FIG. 4 is a partially enlarged cross-sectional view of the tire in FIG. 3.

The tire 1 is a tire for passenger cars, for example, and as shown in FIGS. 1 and 2, includes a pair of beads 11 provided at both sides in the tire-width direction, a tread 12 forming the contact patch with the road surface, and a pair of side walls 13 extending between the pair of beads 11 and the tread 12.

The bead 11 includes an annular bead core 21 formed by wrapping around several times bead wires made of metal coated with rubber, and a bead filler of tapered tip shape extending to the outer side in the tire-radial direction of the bead core 21. The length in the tire-radial direction of the bead filler is normally at least 15 mm. The bead core 21 is a member which plays a role of fixing a tire filled with air to the rim of a wheel which is not illustrated. The bead filler 22 is a member provided in order to raise the rigidity of the bead peripheral part and to ensure high maneuverability and stability, and is configured from high-modulus rubber of a higher modulus than the surrounding rubber members, for example.

A carcass ply 23 constituting a ply serving as the skeleton of the tire is embedded inside of the tire 1. The carcass ply 23 extends from one bead core to the other bead core. In other words, it is embedded in the tire 1 between the pair of bead cores 21, in a form passing through the pair of side walls 13 and the tread 12.

The carcass ply 23 includes a ply body 24 which extends from one bead core to the other bead core, and extends between the tread 12 and bead 11, and a ply folding part 25 which is folded around the bead core 21. The carcass ply 23 is configured by a plurality of ply cords extending in the tire-width direction. In addition, a plurality of ply cords is arranged side by side in a tire circumferential direction. This ply cord is configured by an insulated organic fiber cord such as polyester or polyamide, or the like, and is covered by rubber.

In the tread 12, at least one ring-shaped steel belt 26 which extends in a circumferential direction of the tire is provided in the outer side in the tire-radial direction of the carcass ply 23. The steel belt 26 is configured by a plurality of steel cords covered by rubber. By providing the steel belts 26, the rigidity of the tire is ensured, and the contact state of the road surface with the tread 12 improves. In the present embodiment, although two layers of steel belts 261, 262 are provided, the number of layered steel belts 26 is not limited thereto.

At the outer side in the tire-radial direction of the steel belt 26, a cap ply 27 serving as a belt reinforcement layer is provided. The cap ply 27 is configured from an insulating organic fiber layer such as of polyamide fibers, and is covered by rubber. By providing the cap ply 27, it is possible to achieve an improvement in durability and a reduction in road noise while travelling.

The tread rubber 28 is provided at the outer side in the tire-radial direction of the cap ply 27. A tread pattern (not illustrated) is provided to the outer surface of the tread rubber 28, and this outer surface serves as a contact patch which contacts with the road surface.

In the bead 11, side wall 13 and tread 12, an inner liner 29 serving as a rubber layer constituting an inside wall surface of the tire 1 is provided to a tire inner cavity side of the carcass ply 23. The inner liner 29 is configured by air permeation resistant rubber, whereby the air inside the tire inner cavity is prevented from leaking to outside.

In the side wall 13, the side wall rubber 30 constituting the outer wall surface of the tire 1 is provided to the outer side in the tire-width direction of the carcass ply 23. This side wall rubber 30 is a portion which bends the most upon the tire 1 exhibiting a cushioning action, and usually flexible rubber having fatigue resistance is adopted therein.

A chafer 31 is provided on the inner side in the tire-radial direction of the carcass ply 23 provided around the bead core 21 of the bead 11. The chafer also extends to the outer side in the tire-width direction of the ply folding part 25 of the carcass ply 23, and rim strip rubber 32 is provided at the outer side in the tire-width direction thereof and the inner side in the tire-radial direction. The outer side in the tire-width direction of this rim strip rubber 32 connects with the side wall rubber 30.

An RFID tag 40 is embedded as an electrical component in the tire 1 of the present embodiment. The RFID tag 40 is a passive transponder equipped with an RFID chip and an antenna for performing communication with external equipment, and performs wireless communication with a reader (not illustrated) serving as the external equipment. As the antenna, a coil-shaped spring antenna, plate-shaped antenna, and various types of rod-shaped antennas can be used. For example, it may be an antenna formed by printing a predetermined pattern on a flexible substrate. In a storage part inside the RFID chip, identification information such as a manufacturing number and part number is stored.

Figure 5:
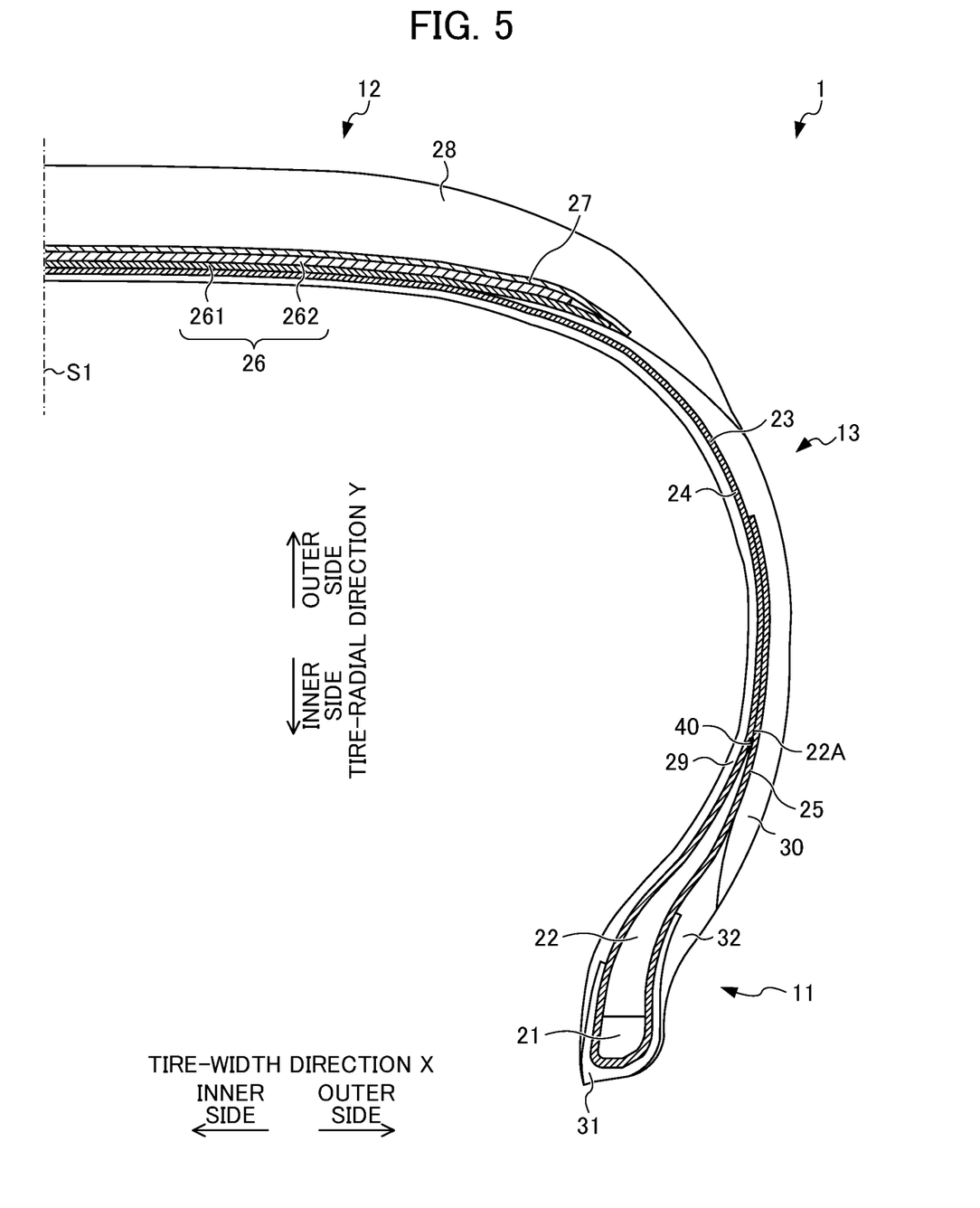
FIG. 5 is a view showing a modified example of the tire according to the embodiment of the present invention, which is a half section in the tire-width direction.
Figure 6:
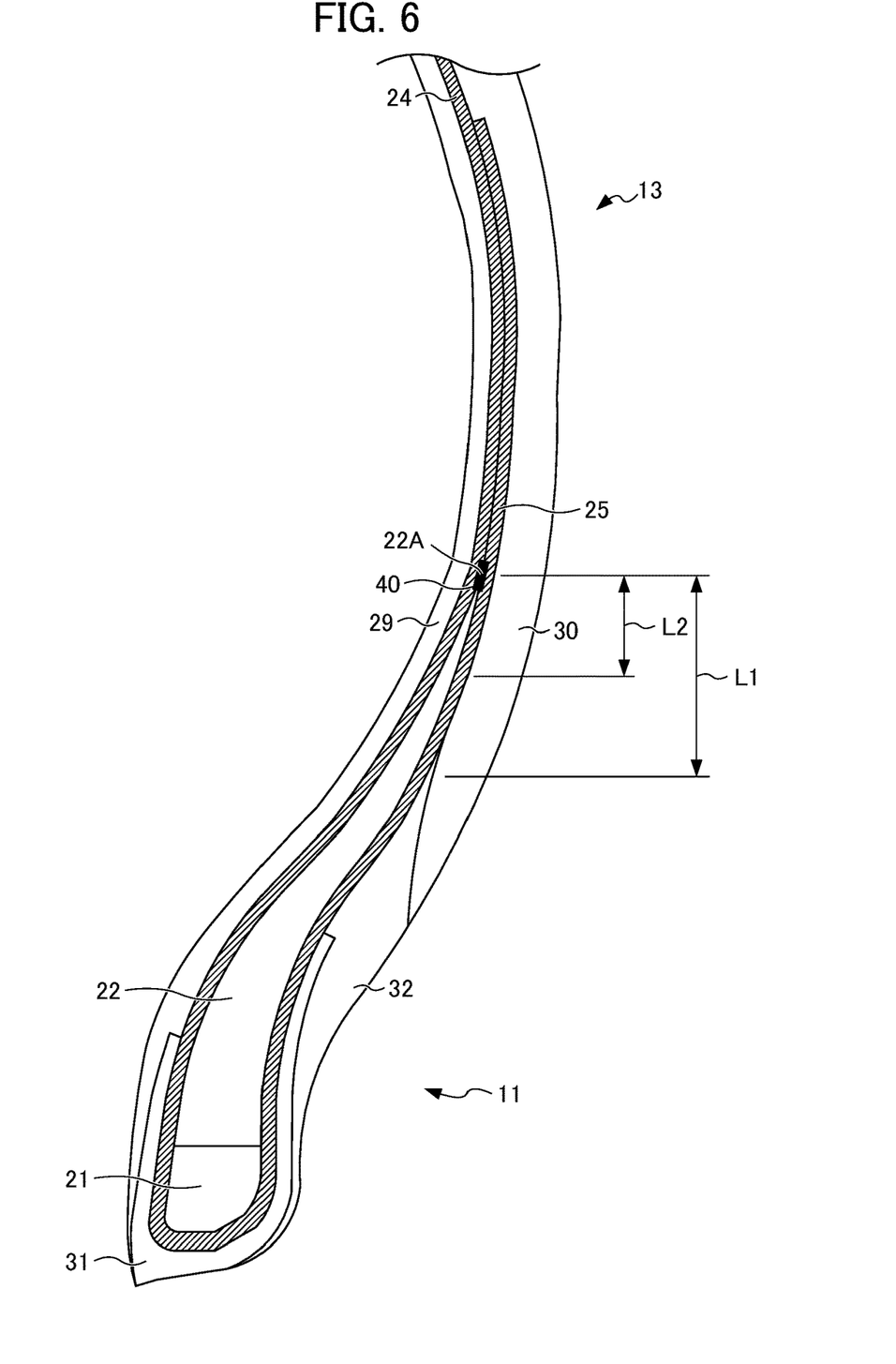
FIG. 6 is a partially enlarged cross-sectional view of the tire in FIG. 5.

As shown in FIG. 1, the RFID tag 40 is embedded in the vicinity of the tire-radial direction outside end 22A of the bead filler 22. More specifically, the RFID tag 40 of the present embodiment is arranged in the area range L1 of 10 mm to the inner side in the tire-radial direction from the tire-radial direction outside end 22A of the bead filler 22, as shown in FIG. 2. More preferably, the RFID tag 40 is fixedly set at a position L2 which is 5 mm+/−3 mm from the tire-radial direction outside end 22A of the bead filler 22. At this time, as shown in FIGS. 1 and 2, or FIGS. 3 and 4, the RFID tag 40 of the present embodiment is fixedly set so as to contact a ply folding part 25 or ply body 24. The RFID tag 40 may be fixedly set at a position of the tire-radial direction outside end 22A of the bead filler 22, as shown in FIGS. 5 and 6.

Figure 7:
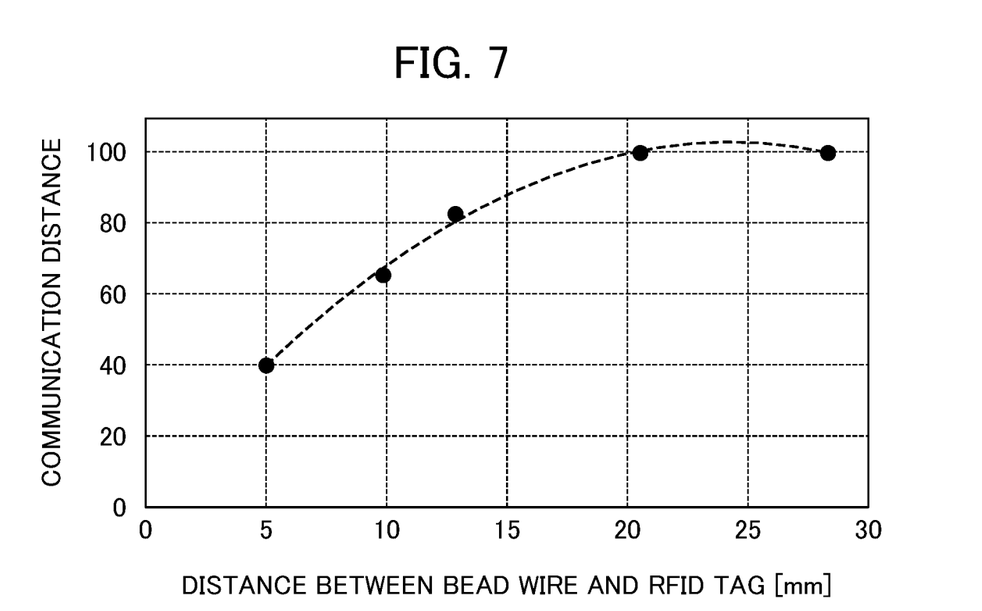
FIG. 7 is a view showing a relationship between the distance from a bead wire and an RFID tag, and communication range.

Herein, FIG. 7 shows the result of studying the relationship of communication range relative to separation distance between the bead core 21 (bead wire) and RFID tag 40. It should be noted that the communication range on the vertical axis is the product of indexing the communication range with the longest communication range as 100. This value may be at least 40, is preferably at least 60, and is more preferably at least 80.

Upon referencing FIG. 7, in the present embodiment, so long as arranging the RFID tag 40 in the area range L1 of 10 mm from the tire-radial direction outside end 22A of the bead filler 22, it is confirmed as being able to eliminate the influence on communication of the bead core 21 sufficiently, in a tire for various types of automobiles, etc. In addition, it is confirmed as being suitable so long as arranging the RFID tag 40 at the position L2 which is 5 mm from the tire-radial direction outside end 22A of the bead filler 22.

On the other hand, for example, it is considered that displacement of the RFID tag 40 arises from the vulcanization process, and thus it becomes necessary to take into account variation in the manufacturing process of the tire 1. In contrast, with the present embodiment, by arranging the RFID tag 40 at a position 5 mm+/−3 mm from the tire-radial direction outside end 22A of the bead filler 22, it is confirmed as being able to suitably maintain the communication performance, and the operational effects related to durability, etc. described later are suitably obtained in a sufficient manner.

By embedding the RFID tag 40 in the area range 10 mm from the tire-radial direction outside end 22A of the bead filler 22, position L2 which is 5 mm+/−3 mm from the tire-radial direction outside end 22A, and in the vicinity of the tire-radial direction outside end 22A of the bead filler 22 at a position of the tire-radial direction outside end 22A, in this way, it becomes sufficiently separated from the bead core 21, which is made of metal.

Since the bead core 21 is a metal member having a particularly high possibility of adversely influencing the communication due to being formed in a ring shape by laminating and winding the bead wire made of metal, the present embodiment makes it possible to maintain suitable communicability with a reader by arranging the RFID tag 40 in the above-mentioned way.

Herein, the RFID tag 40 of the present embodiment is mounted prior to the vulcanization process in the manufacturing process of the tire 1, and the RFID tag 40 is mounted in advance to the bead filler 22, or the ply folding part 25 or ply body 24 of the carcass ply 23 prior to the coating rubber being vulcanized. At this time, due to being a state in which the coating rubber of the bead filler 22 or carcass ply 23 is raw rubber prior to vulcanization, it is possible to paste the RFID tag 40 to the bead filler 22 or carcass ply 23, using the adhesiveness thereof. It should be noted that it may be pasted using an adhesive or the like. Then, after pasting the RFID tag 40, the green tire in which the respective constituent members including the RFID tag are assembled is vulcanized in the vulcanization process to manufacture the tire.

In the present embodiment, since it is thereby possible to position the RFID tag 40 at a predetermined position and fixedly set by pasting the RFID tag 40 to the carcass ply 23 or bead filler 22 coated by raw rubber having rigidity and adhesiveness during tire manufacture, the assembly work of the RFID tag 40 in the tire manufacturing process can be carried out easily.

On the other hand, displacement of the RFID 40 arises due to the vulcanization process. In other words, it becomes necessary to also consider variation in the manufacturing process of the tire 1. In contrast, with the present embodiment, by arranging the RFID tag 40 at the position L2 which is 5 mm+/−3 mm from the tire-radial direction outside end 22A of the bead filler 22, it is confirmed as being able to suitably maintain the communication performance, and the operational effects related to durability, etc. described later are suitably obtained in a sufficient manner.

Figure 8A:
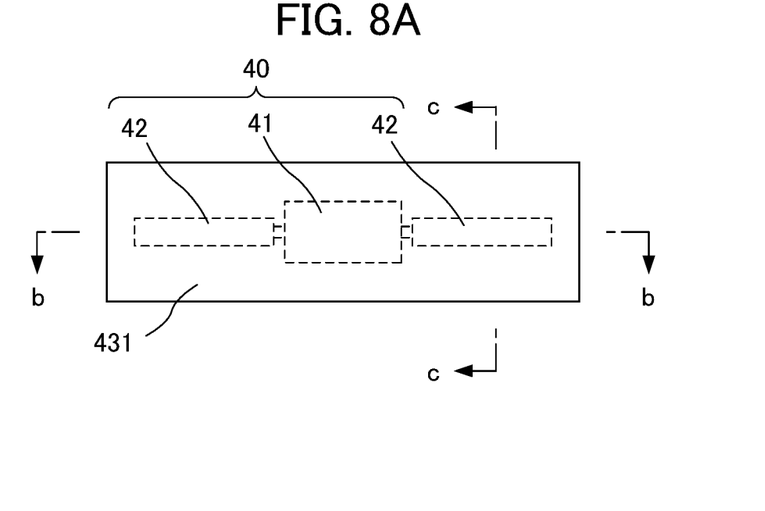
FIG. 8A is a view showing an RFID tag which is protected by a protective member in the tire according to the embodiment of the present invention.
Figure 8B:
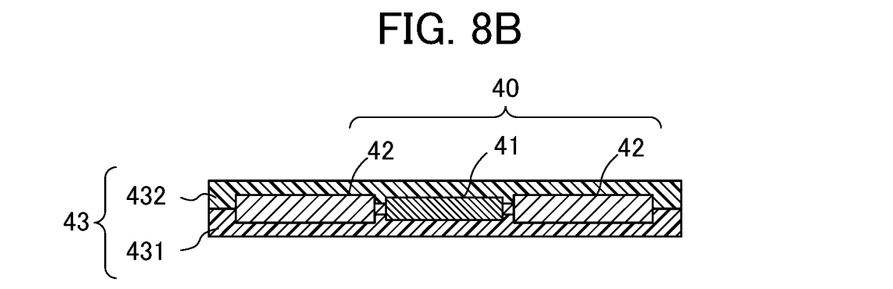
FIG. 8B is a view showing a cross section along the line b-b in FIG. 8A.

Herein, FIG. 8A is a view showing an example of the RFID tag 40 covered by the protective member 43 configured from the rubber sheet. In FIG. 8A, the RFID tag 40 is covered by a rubber sheet 431 described later to be hidden. FIG. 8B is a cross-sectional view along the line b-b in FIG. 8A, and FIG. 8C is a cross-sectional view along the line c-c in FIG. 8A.

Figure 8C:
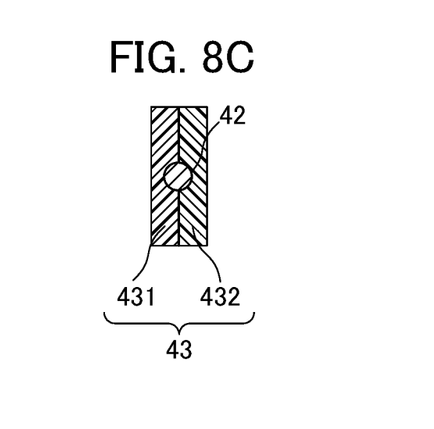
FIG. 8C is a view showing a cross-section along the line c-c in FIG. 8A.
Figure 9:
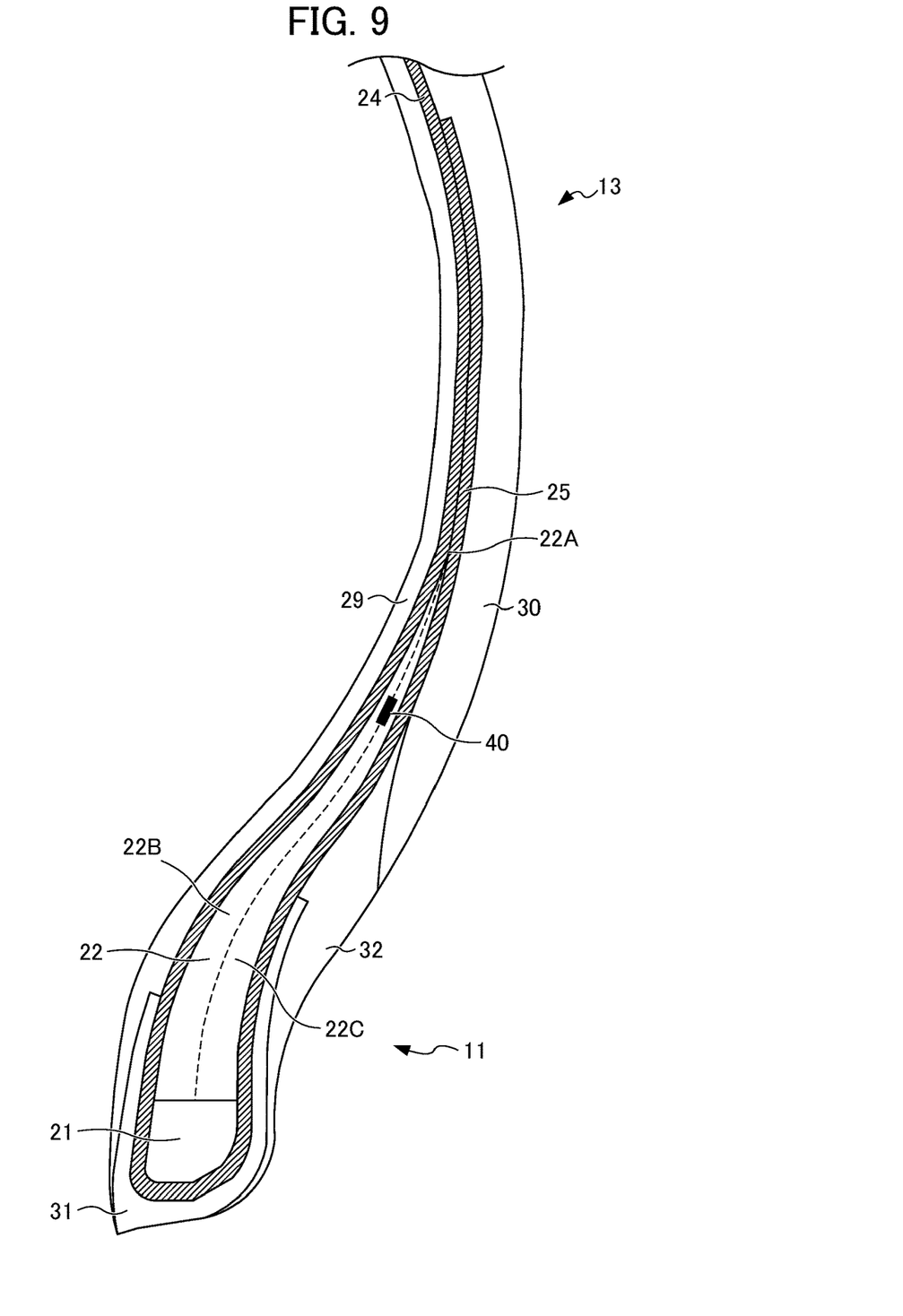
FIG. 9 is a view showing a modified example of the tire according to the embodiment of the present invention, which is a half section in the tire-width direction.

In the present embodiment, the RFID tag 40 is covered by the protective member 43, as shown in FIG. 8.

The RFID tag 40 includes an RFID chip 41 and antenna 42 for performing communication with external equipment. As the antenna 42, a coil-shaped spring antenna, plate-shaped antenna, and various types of rod-shaped antennas can be used. For example, it may be an antenna formed by printing a predetermined pattern on a flexible substrate. When considering the communicability and flexibility, a coil-shaped spring antenna is the most preferable.

The protective member 43 is configured from two rubber sheets 431, 432 which protect by sandwiching the RFID tag 40.

The protective member 43 is configured by rubber of a predetermined modulus, for example. Herein, the modulus indicates 100% elongation modulus (M100) under a 23° C. atmosphere, measured in accordance with "3.7 stress at a given elongation, S" of JIS K6251:2010.

As the rubber adopted in the protective member 43, rubber at least having a higher modulus than the side wall rubber 30 is used. For example, with the modulus of the side wall rubber 30 as a reference, it is preferable to use rubber of a modulus 1.1 to 2 times as the rubber used in the protective member 43.

In addition, the protective member 43 may be configured from a short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the protective member 43, a rubber sheet in the vulcanized state may be used. The rubber sheet in a vulcanized state does not plastically deform as raw rubber, and thus can appropriately protect the RFID tag 40. In addition, as the protective member 43, an organic fiber layer from polyester fibers or polyamide fibers may be provided. It is also possible to embed an organic fiber layer in the two rubber sheets 431, 432.

In this way, if configuring the protective member 43 by two rubber sheets, since it is possible to thinly form the RFID tag 40 including the protective member 43, it is favorable upon embedding in the tires 1 to 3. In addition, when assembling the RFID tag 40 in the constitutional members of the tires 1 to 3 prior to vulcanization, the RFID tag 40 covered by the rubber sheets can be installed very easily.

For example, at a desired position of the carcass ply 23 (or bead filler 22), it is possible to appropriately paste the RFID tag 40 covered by the rubber sheets using the adhesiveness of the raw rubber. In addition, by also establishing the rubber sheets as raw rubber prior to vulcanization, it is possible to more easily paste by employing the adhesiveness of the rubber sheet itself as well.

However, the protective member 43 is not limited to the form configured by two rubber sheets, and can adopt various forms. For example, the rubber sheet constituting the protective member, so long as covering at least part of the RFID tag 40, can obtain effects such as an improvement in workability in the manufacturing process and stress mitigation. In addition, for example, it may be a configuration wrapping one rubber sheet around the entire circumference of the RFID tag 40, or a configuration attaching the protective member in the form of a potting agent of high viscosity along the entire circumference of the RFID tag 40. Even if such a configuration, it will be possible to appropriately protect the RFID tag 40. It should be noted that the RFID tag 40 according to the present invention is not necessary configured to be covered by the protective member 43.

In the present embodiment, in the case of adopting a configuration protecting the RFID tag 40 by way of the protective member 43, the RFID tag 40 comes to be sandwiched between the ply body 24 and ply folding part 25, or between the ply body 24 and bead filler 22, or between the ply folding part 25 and bead filler 22, in a state covered by the protective member 43. In this case, even under the condition of the RFID tag 40 receiving stress by the ply body 24 and ply folding part 25 relatively moving, the RFID tag 40 is protected by the presence of the protective member 43. Consequently, the durability of the RFID tag 40 further improves.

It should be noted that the protective member 43 may be provided to only one side of the RFID tag 40. On the other hand, if taking account the matter of preventing stress concentration between the carcass ply 23 and RFID tag 40 according to the differences in expansion/contraction amount between constituent members of the tire during manufacture such as the vulcanization process, and preventing stress concentration between the carcass ply 23 and RFID tag 40 generated by distortion of the tire during use, for example, a rubber sheet or fiber layer may be provided as a protective member to only the outer side in the tire-width direction of the RFID tag 40, i.e. side of the carcass ply 23. In the case of providing the protective member 43 to only one side of the RFID tag 40, it is possible to make the overall thickness thinner.

Herein, during the manufacture of the tire (tire manufacturing method of the present embodiment), the RFID tag 40 covered by the protective member 43 (or the RFID tag 40 which is not covered by the protective member 43) is pasted so that the longitudinal direction thereof becomes the direction of the tangential line relative to the circumferential direction of the tire, i.e. direction orthogonal to the paper plane in the cross-sectional view in FIGS. 1 to 6. For example, in the manufacturing process, a surface of either one of the rubber sheets 431, 432 is fixedly set as in the present embodiment as mentioned above by pasting to the carcass ply 23 which is a constituent member of the tire prior to vulcanization. Stress will hardly act on the RFID tag 40 even when the tire deforms. In addition, in the manufacturing process, the work for mounting the RFID tag 40 covered by the protective member 43 becomes simple.

Therefore, in the tire 1 of the present embodiment, the RFID tag 40 is arranged as mentioned above at a position far from the bead core 21 which is made of metal, and far from the steel belt 26; therefore, the RFID tag 40 is hardly adversely influenced by components made of metal, and it is possible to maintain more suitable communication performance.

In addition, the RFID tag 40 of the present embodiment, by the movement being restricted by the fiber layer constituting the carcass ply 23, and additionally, hardly receiving influences such as distortion of the tire during travel by being embedded in the bead filler 22 having high modulus. Consequently, it is possible to improve the durability of the RFID tag 40 by way of existing components, without using additional components.

Furthermore, according to the present embodiment, since the RFID tag 40 is provided within the bead filler 22 surrounded by the fiber layer constituting the carcass ply 23, and since the distance from the outer wall surface of the tire 1 until the RFID tag 40 is far, the RFID tag 40 is protected even if shock acts on the side wall 13.

It should be noted that the RFID tag 40 embedded in the tire, when including an antenna, often has a longitudinal direction, as shown as the RFID tag 40 in FIG. 8. It is preferable for such an RFID tag 40 to be embedded in the tire 1, so that the longitudinal direction thereof is a direction of the tangential line to the circumferential direction of the tire, i.e. direction orthogonal to the paper plane in the cross-sectional views of FIGS. 1 to 6. By embedding in this way, stress is hardly applied to the RFID tag 40, when the tire deforms.

In addition, in the present embodiment, although the RFID tag 40 is embedded in the tire 1 as an electronic component, the electronic component embedded in the tire is not limited to the RFID tag 40. For example, it may be various electronic components such as a sensor which carries out wireless communication. There is a possibility of the performance of the electronic component declining due to external shock or the influence of stress at the periphery. Consequently, even in the case of embedding various electronic components in a tire, it is possible to obtain the effects of the present invention. For example, the electronic component may be a piezoelectric element or strain sensor.

According to the tire 1 of the present embodiment, the following effects are exerted.

(1) With the tire 1 according to the present embodiment, the RFID tag 40, which is the electronic component, is embedded in a area range L1 of 10 mm to the inner side in the tire-radial direction from the tire-radial direction outside end of the bead filler 22. Since it is thereby possible to arrange the RFID tag 40 at a position distanced from metal components such as the bead core 21, the performance of the communication function, etc. of the RFID tag 40 can be maintained.

(2) In the tire 1 according to the present embodiment, the RFID tag 40 which is the electronic component is embedded at the position L2 which is 5 mm+/−3 mm from the tire-radial direction outside end of the bead filler 22. It thereby becomes possible suitable ensure the communication performance, etc., and embed the RFID tag 40 in the tire 1.

(3) In the tire 1 according to the present embodiment, the RFID tag 40 which is the electronic component is provided between the bead filler 22 and carcass ply 23. It is thereby possible to protect the RFID tag 40 by way of existing components, without using additional components. It should be noted that, since the bead filler 22 is also high modulus, the motion of the RFID tag 40 is restricted also by this bead filler 22, and the durability of the RFID tag 40 improves.

(4) In the tire 1 according to the present embodiment, the RFID tag 40 which is the electronic component is provided between the bead filler 22 and the ply folding part 25 of the carcass ply 23 folded back around the bead core 21 and arranged at the outer side in the tire-width direction relative to the bead filler 22. It is thereby possible to protect the RFID tag 40 by way of existing components, without using additional components. It should be noted that, since the bead filler 22 is also high modulus, the motion of the RFID tag 40 is restricted also by this bead filler 22, and the durability of the RFID tag 40 improves.

(5) In the tire 1 according to the present embodiment, the RFID tag 40 which is the electronic component is provided between the bead filler 22 and the ply body 24 of the carcass ply 23 arranged at the outer side in the tire-width direction relative to the bead filler 22. It is thereby possible to protect the RFID tag 40 by way of existing components, without using additional components. Furthermore, since the RFID tag 40 is arranged more to the inner side in the tire-width direction than the above (4), durability further improves. It should be noted that, since the bead filler 22 is also high modulus, the motion of the RFID tag 40 is restricted also by this bead filler 22, and the durability of the RFID tag 40 improves.

(6) The manufacturing method of the tire 1 according to the present embodiment mounts the RFID tag 40 which is the electronic component, so that the longitudinal direction thereof follows the direction of the tangential line relative to the circumferential direction of the tire 1. Stress thereby hardly acts on the RFID tag even when the tire deforms. In addition, the work for mounting the RFID tag 40 becomes simple, and it becomes possible to improve the manufacturing quality.

(7) In The tire 1 according to the present embodiment, the RFID tag 40 is mounted so that a longitudinal direction thereof follows a direction of a tangential line relative to a circumferential direction of the tire 1.

(8) The manufacturing method of a tire 1 according to the present embodiment, the RFID tag 40 is provided between the bead filler 22 and the carcass ply 23.

It should be note that the tire of the present invention can be adopted as various types of tires such as of a car, light truck, truck or bus; however, it is particularly suitable as a tire for a car. It should be noted that the present invention is not to be limited to the above-mentioned embodiment, and even if conducting modifications, improvements, etc. within a scope that can achieve the object of the present invention, will be encompassed in the scope of the present invention.

It should be noted that, although the tire of the present invention can be adopted as various types of tires such as for cars, light trucks, trucks and buses, it is particularly suitable as a tire for passenger cars. It should be noted that the present invention is not to be limited to the above-mentioned embodiments, and that even when carrying out modifications, improvements, etc. within a scope capable of achieving the object of the present invention, it is encompassed by the scope of the present invention.

Figure 10:
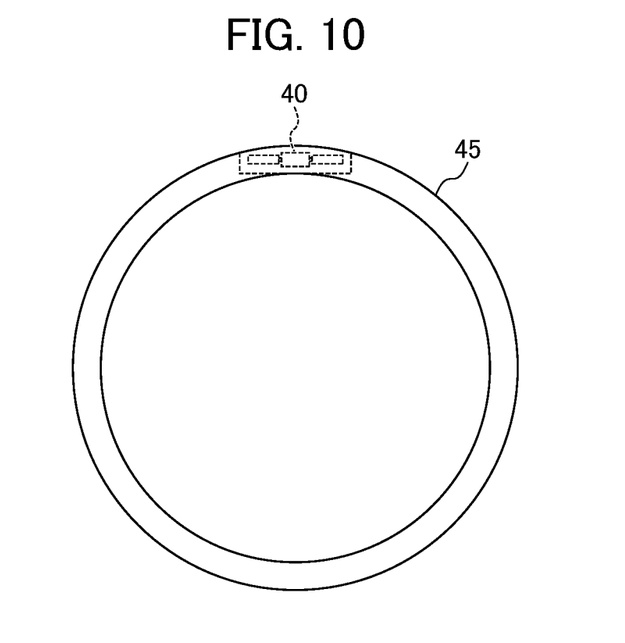
FIG. 10 is a plan view of a state providing the RFID tag to a ring-shaped rubber sheet.
Figure 11:
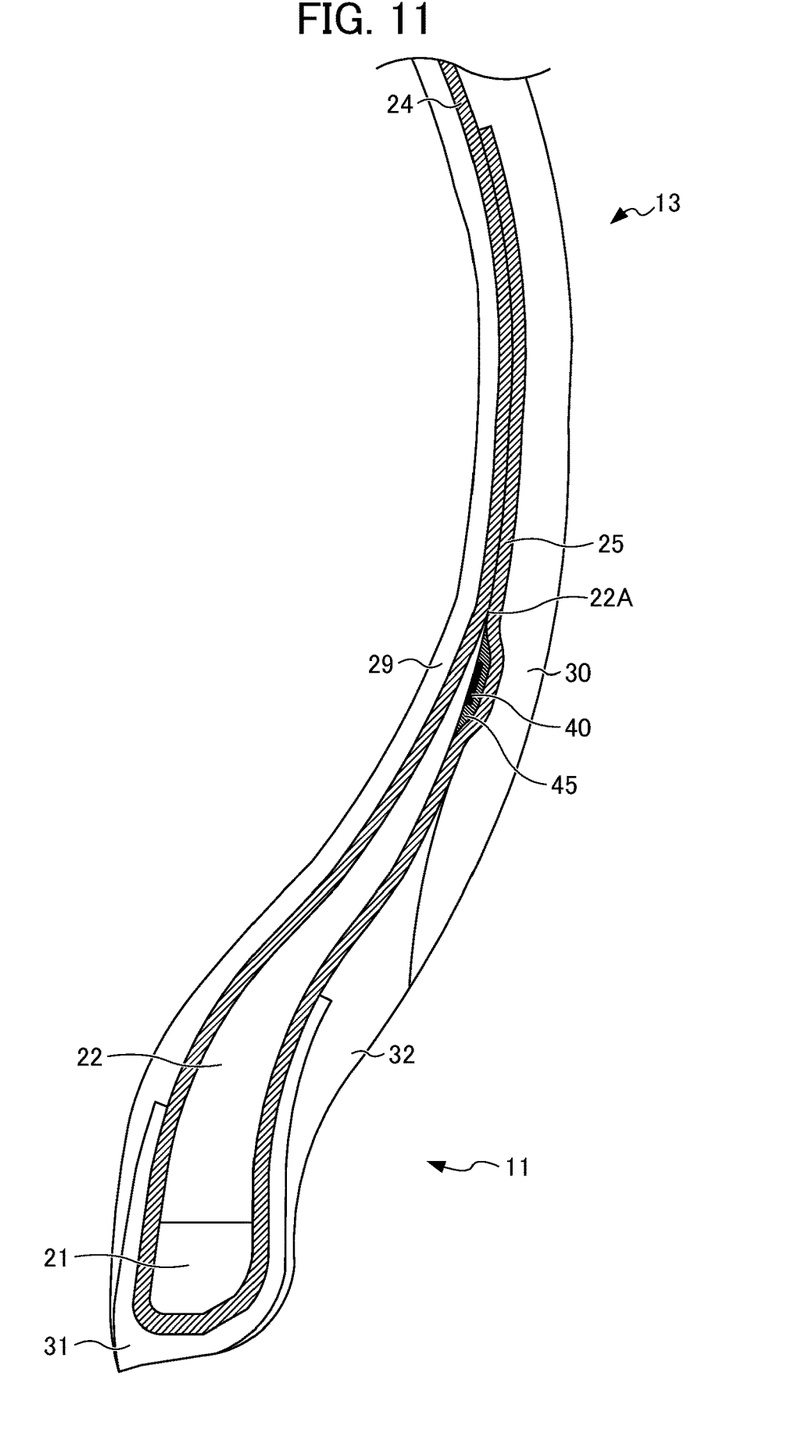
FIG. 11 is a view showing a modified example of the tire according to the embodiment of the present invention, which is a half view in the tire-width direction of the tire including the ring-shaped rubber sheet and RFID tag of FIG. 10.
Figure 12:
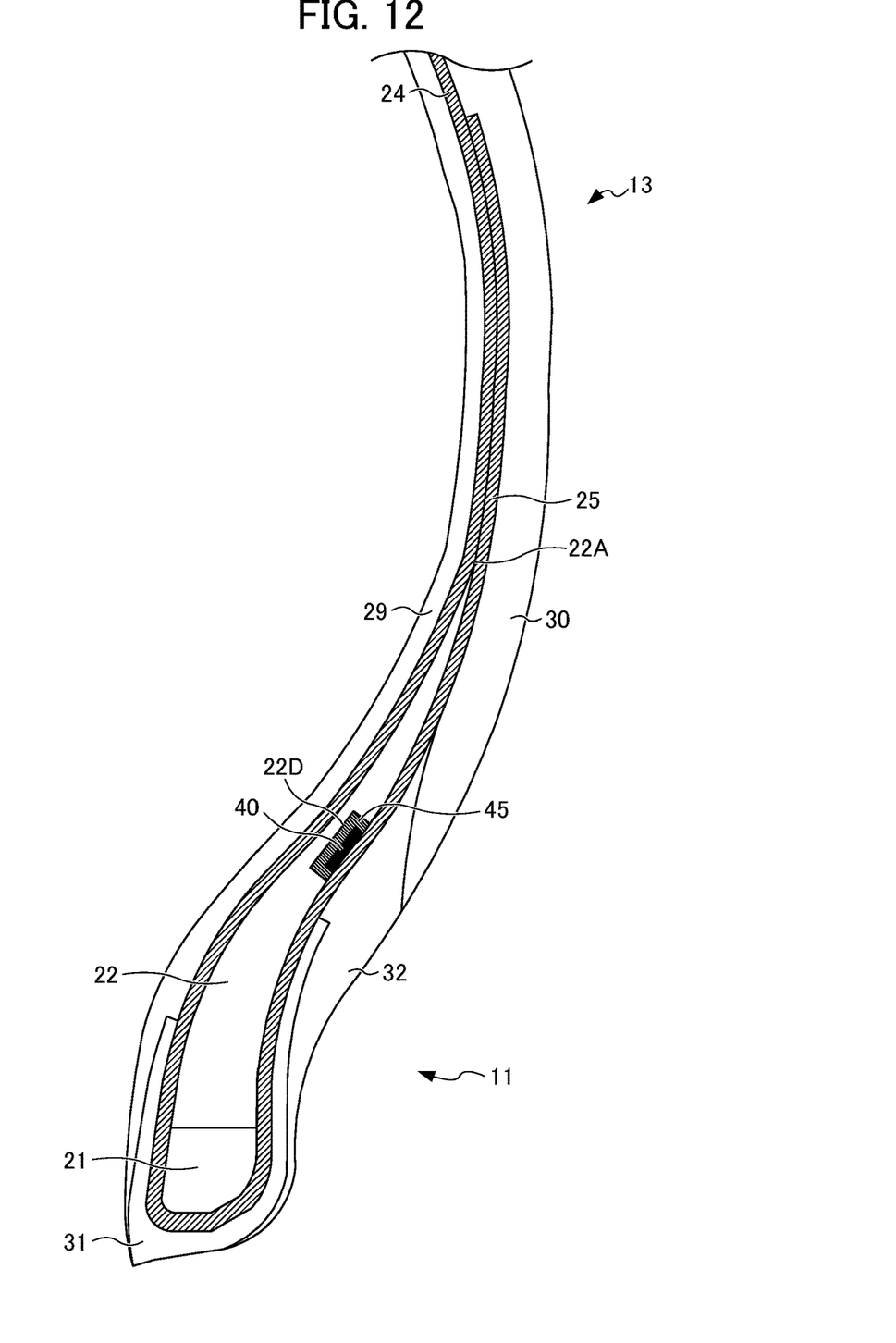
FIG. 12 is a view showing a modified example of the tire according to the embodiment of the present invention, which is a half view in the tire-width direction of the tire including the ring-shaped rubber sheet and RFID tag of FIG. 10.

Furthermore, as shown in FIG. 10, the tire 1 may be configured by embedding an electronic component such as the RFID tag 40 by a ring-shaped rubber sheet 45, and embedding this rubber sheet 45 concentrically within the structure of the tire 1. At this time, as shown in FIG. 11, the rubber sheet 45 may be pasted to the surface of the bead filler 22, and a ring-shaped recess 22D may be provided to the bead filler using extrusion molding or the like as shown in FIG. 12, and an electronic component such as the RFID tag 40 may be provided by pasting while fitting the rubber sheet 45 in this ring-shaped recess 22D.

Then, in this case, it becomes possible to prevent problems such as uniformity deterioration during manufacture such as the vulcanization process, without a level difference being produced by providing an electronic component such as the RFID tag 40. Consequently, even in a case of embedding an electronic component such as the RFID tag 40 in the tire 1, it becomes possible to provide with certainty the tire 1 having high confidence which is high quality. Furthermore, it is possible to appropriately paste an electronic component such as the RFID tag 40 covered by the rubber sheet 45 at a desired position on the bead filler 22 prior to vulcanization, using the adhesiveness of the raw rubber. In addition, it is possible to more simply paste the rubber sheet 45 also using the adhesiveness of the rubber sheet 45 itself, by establishing as raw rubber prior to vulcanization.

What is claimed is:

1. A tire comprising:
a pair of beads having a bead filler which extends to an outer side in a tire-radial direction of a bead core; and
a carcass ply which extends from one bead to an other bead, and is folded back around the bead core,
wherein an electronic component is embedded in an area range of up to a position 10 mm to an inner side in a tire-radial direction from a tire-radial direction outside end of the bead filler,
wherein the electronic component is provided between the bead filler and the carcass ply, and
wherein the electronic component is mounted so that a longitudinal direction thereof follows a direction of a tangential line relative to a circumferential direction of the tire.

2. The tire according to claim 1, wherein the electronic component is embedded at a position which is 2 mm to 8 mm from the tire-radial direction outside end of the bead filler.

3. The tire according to claim 1, wherein the electronic component is provided between the bead filler, and a ply folding part of the carcass ply which is folded back around the bead core and disposed to an outer side in a tire-width direction relative to the bead filler.

4. The tire according to claim 1, wherein the electronic component is provided between the bead filler and a ply body of the carcass ply which is disposed at an inner side in a tire-width direction relative to the bead filler.

5. A manufacturing method of a tire which includes: a pair of beads having a bead filler which extends to an outer side in a tire-radial direction of a bead core;
a carcass ply which extends from one bead to an other bead, and is folded back around the bead core, and
an electronic component being embedded in an area range of up to a position 10 mm to an inner side in a tire-radial direction from a tire-radial direction outside end of the bead filler, wherein the electronic component is provided between the bead filler and the carcass ply, and wherein the method comprises a step of mounting the electronic component so that a longitudinal direction thereof follows a direction of a tangential line relative to a circumferential direction of the tire.

* * * * *